(No Model.)  3 Sheets—Sheet 1

P. S. MARCELLUS.
PANORAMIC ROLL HOLDER CAMERA.

No. 512,512.  Patented Jan. 9, 1894.

Witnesses:  
Jesse B. Heller.  
H. Alford Boggs.

Inventor.  
Percy Shelley Marcellus,  
per John F. Nolan,  
Attorney.

(No Model.) 3 Sheets—Sheet 2.
P. S. MARCELLUS.
PANORAMIC ROLL HOLDER CAMERA.
No. 512,512. Patented Jan. 9, 1894.
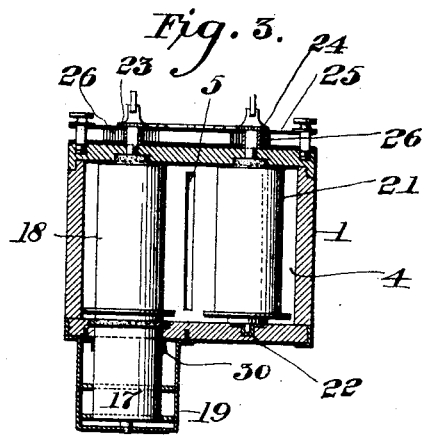
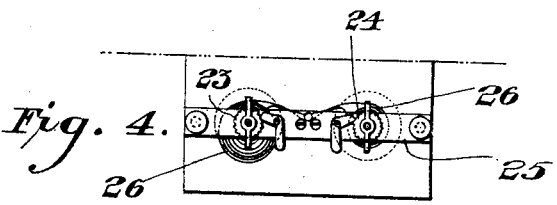
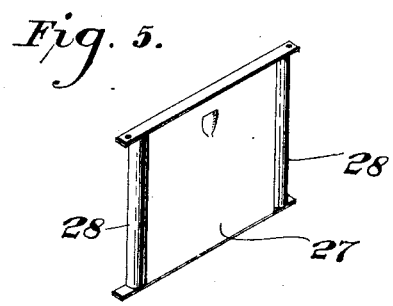
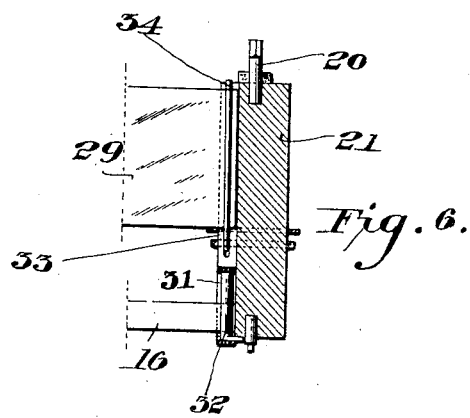
Witnesses:
Jesse B. Heller.
H. Alford Boggs
Inventor.
Percy Shalley Marcellus,
per John F. Nolan
Attorney.

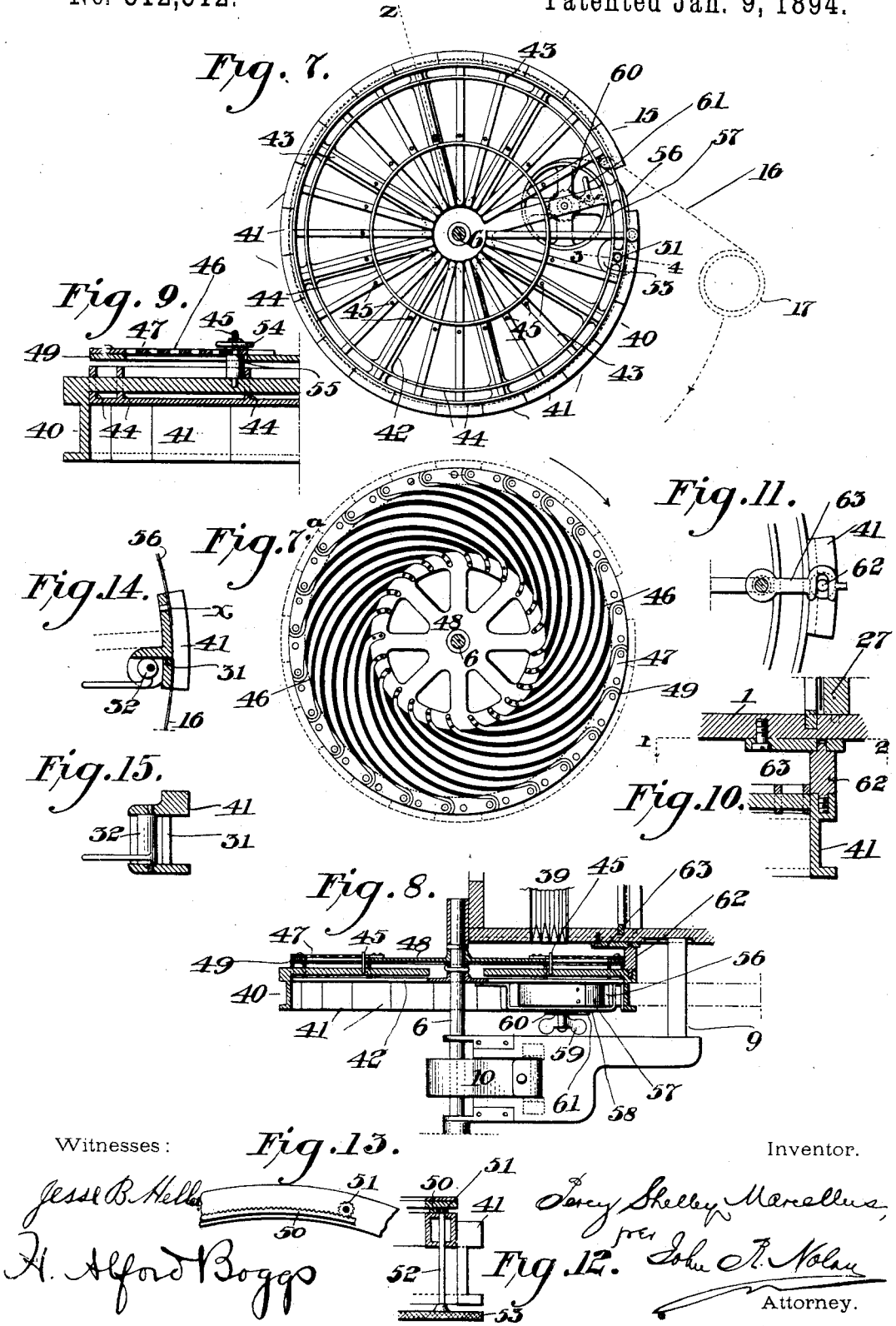

UNITED STATES PATENT OFFICE.

PERCY SHELLEY MARCELLUS, OF PHILADELPHIA, PENNSYLVANIA.

PANORAMIC ROLL-HOLDER CAMERA.

SPECIFICATION forming part of Letters Patent No. 512,512, dated January 9, 1894.

Application filed July 27, 1893. Serial No. 481,627. (No model.)

*To all whom it may concern:*

Be it known that I, PERCY SHELLEY MARCELLUS, a citizen of the United States, residing in the city and county of Philadelphia and State of Pennsylvania, have invented certain new and useful Improvements in Photographic Cameras, of which the following is a full, clear, and exact description, reference being had to the accompanying drawings, forming a part of this specification.

This invention has reference to that class of photographic instruments by which may be had a panoramic view of the surrounding scene, in whole or in part; the camera in such instruments being rotatable, and the flexible sensitized film being so arranged therein that during the revolution of the camera, it, said film, is progressively conducted into the focus of the lens.

The leading features of my invention relate to a construction whereby synchronous movements of the lens and the film shall be effected, and to a novel and efficient means whereby the focal distance may be varied as occasion may require and the relative movements of the lens and the film thereupon accurately adjusted in respect to the varied focus, as hereinafter explained.

The invention also embraces various points in matters of construction and organization that will be hereinafter set forth in detail.

Figure 1:
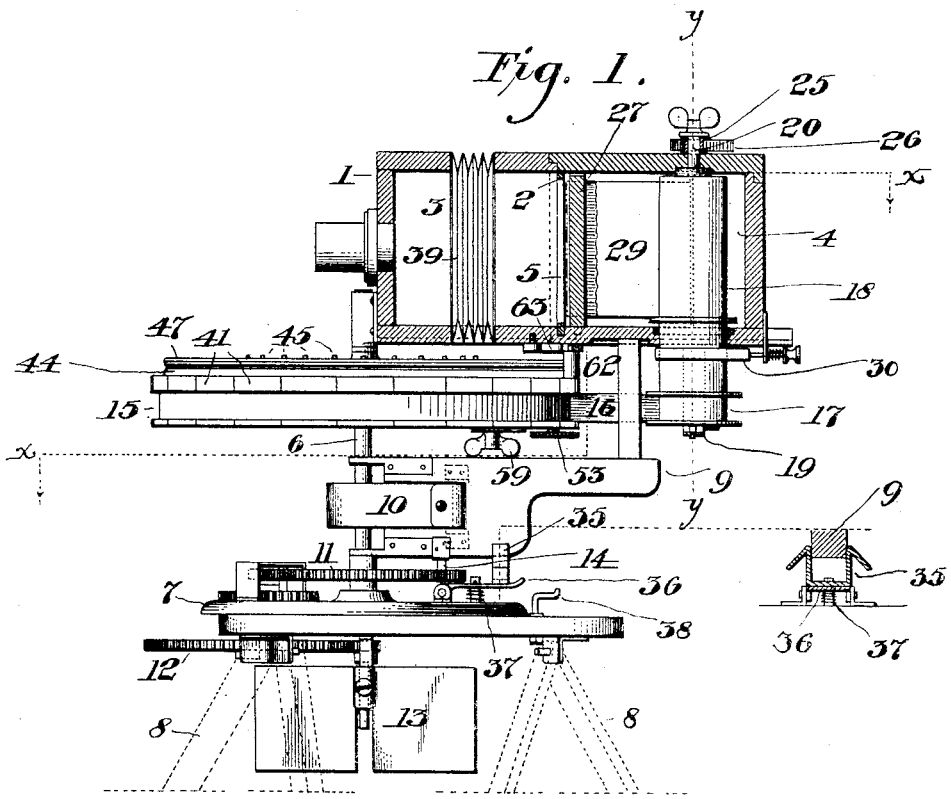
Figure 2:
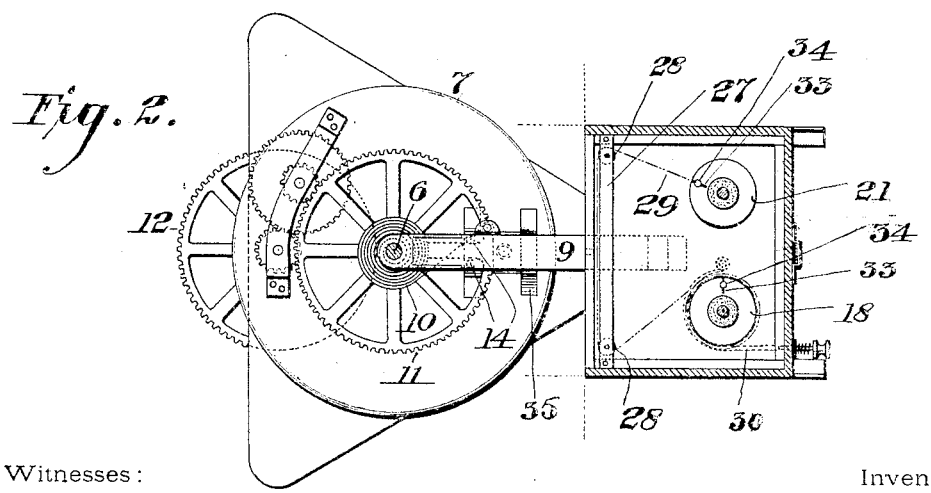

In the annexed drawings, Figure 1 is a vertical sectional elevation of a camera embodying my invention. Fig. 2 is a transverse horizontal section, on the line x—x, Fig. 1. Fig. 3 is a transverse vertical section through the camera case on the line y—y, Fig. 1, the case supporting and operating parts being omitted. Fig. 4 is a plan of the rear portion of the case showing the spring mechanism for controlling the film-delivery and film take-up rollers: Fig. 5 is a perspective view of the vertical slide-piece in which the guide rollers are supported. Fig. 6 is a vertical section through the film-delivery roller showing the means for securing the film and operating band thereto. Fig. 7 is a plan of the segmental wheel for controlling the movement of the film during the revolution of the camera case, the cam-plate for adjusting the segments, to vary the diameter of the wheel, being detached and shown in Fig. 7ª. Fig. 8 is a vertical section through the said wheel and its immediate connections. Fig. 9 is a vertical section, enlarged, as on the radial line z of Fig. 7, the cam-plate and the means for locking the same in place, being shown. Fig. 10 is an enlarged view of a portion of the segmental wheel showing a means for detachably connecting the same with the camera case. Fig. 11 is a section, as on the line 1—2 of Fig. 10. Fig. 12 is a section, enlarged as on the line 3—4 of Fig. 7 the cam-plate being shown as in place. Fig. 13 is a view of the under side of a portion of the cam wheel showing the rack and pinion device for rotating said wheel, as hereinafter described. Fig. 14 is a horizontal section through the segment to which the ends of the operating band and an extensible metallic surface band are secured. Fig. 15 is a vertical section through said segment.

The numeral 1 represents the camera case in which the lens and the film bearing and guiding devices are supported. This case is divided by a partition 2 to form two compartments 3, 4, the forward one (3) of which receives the lens, while that (4) in the rear contains the film supporting devices. The partition is provided with a central vertical opening 5 therein through which the film may be exposed to the action of the lens.

The camera-case is pivoted on its forward end, directly in line with the optical center of the lens so that the case with its contents may be revolved in a horizontal plane as in cycloramic cameras of previous construction. In the present instance the case is pivoted to a vertical post 6 rising from a substantial base plate 7 which is adapted to be supported on the usual tripod 8. The rear portion of the case is supported upon an arm 9 which is also pivoted to the post, so as to revolve with the case. The inner end of this arm is bifurcated to receive a stout coiled spring 10, one end of which is secured to the post while the other or outer end is fastened to the arm as shown. Hence if the case be turned in one direction the spring will be wound up and if the case be then released the consequent recoil of the spring will automatically revolve the case in a reverse direction. On the lower end of the post is loosely mounted a large spur wheel 11 of a speed regulating train 12 which is equipped with a governor fan 13 similarly to a fan motor. A couple of depending pins 14 on the swinging arm 9 embrace one arm of the wheel 11 so that the gear and fan devices during the expansion of the spring serve to regulate the action of the latter and thus effect a steady and uniform revolution of the case. The fan as will be observed is disposed on the under side of the base plate so as to be shielded by the tripod. Secured to the vertical post is a large wheel 15 which I term the "film gage." It is connected with the film supporting devices in a manner to effect the uniform feeding of the film to the focus of the lens during the revolution of the camera. The radius of this wheel is determined by the focal distance, good results being attained only by making the radius of the wheel equal thereto—that is to say, the working periphery of the wheel should extend to a point in line vertically with the exposed portion of the film when the latter is in focus. Attached at a suitable point to the periphery of the wheel is one end of a band 16, the other end of which is secured to an extension 17 on the lower end of a roller 18 which I term the film-delivery roller. This extension is provided with a trunnion which is supported in a bracket 19 on the bottom of the case, while the upper end of the roller is provided with a trunnion 20 which extends through and beyond a hole in the hinged lid of the case. Adjacent to this roller 18 is another roller 21, which I term the take-up roller, the trunnion on the lower end of which is fitted to a step 22 in the bottom of the case, the upper trunnion extending through and beyond a hole in the lid similarly to the corresponding trunnion of the roller 18. The outer ends of the upper trunnion are square in cross section, to enter correspondingly shaped sockets in the studs of ratchet wheels 23, 24, that are mounted in a frame 25 on the top of the lid. The teeth of these ratchet wheels are oppositely disposed, suitable spring-controlled pawls therefor being provided. To each of these ratchets is secured one end of a coiled spring 26, its other end being fastened to the frame bar. The two springs act in contrary directions. While the ratchet and pawl devices allow the springs to be wound up tightly yet they prevent the expansion of the springs until the pawls are disengaged from the ratchet teeth. In that event, the action of the springs is to rotate the two rollers reversely. Fitted to the chamber 4 adjacent to the partition or diaphragm 2, is a vertical slide piece 27 on the respective ends of which are mounted rollers 28 which I term guide rollers.

The ends of the sensitive film 29 are secured to the rollers 18 and 21 respectively, the film being passed around the guide rollers, so that as it is wound from one roller to the other it is drawn in front of the opening 5 in the partition. The film is of such length that as it is progressively fed to the focus of the lens it will receive the entire scene encircling the camera during the revolution of the latter.

At the outset, the camera is revolved on its axis to contract the spring 10 sufficiently to enable it, when released, to rotate the camera in a reverse direction as above described. The film is wound upon the roller 21 and the latter applied to the camera. The free end of the film is then connected with the roller 18. The lid of the camera is now closed so as to engage the respective rollers with the spring and ratchet devices. The pawl is then disengaged from the ratchet 23 and the attached roller 18 rotated through the medium of the thumb-piece on the ratchet wheel until the film is wound on the roller. This being done the spring 26 which is connected with the ratchet 23 is opened or expanded, while that on the ratchet 24 of the take-up roller is wound up tightly and held by means of the pawl. The parts are now set. To use the instrument, the pawl is re-engaged, with the ratchet 23, so as to permit the connected spring to be wound up, while the other pawl is disengaged from the ratchet 24 to permit its spring to expand. During the rotation of the latter the band is wound upon the lower extension thereof, which band is of such length that it is drawn taut when the winding of the film upon the roller has been completed. This band is preferably composed of film material so that the number of layers thereof so wound is equal to that of the film wound on the roller. The camera being released it is gradually revolved by the reaction of the spring 10, thereby drawing the band 16 against and around the periphery of the wheel 15 and perforce unwinding said band from the extension of the roller 18. Consequently the latter will be turned in synchronism with the movement of the camera, and the film on said roller will be correspondingly unwound therefrom. During this operation the roller 21, through the action of the expanding spring 26 connected therewith will wind up the film as rapidly as it is freed, the tension exerted by the spring on the end of the roller 18 insuring a steady and uniform delivery of the film. I also provide on the bottom of the camera case a spring friction strap 30 which embraces the lower portion of the roller 18 and thus aids still further to steady the movement of the roller. The ends of the band are preferably secured to the wheel 15 and the roller extension, respectively, by the means shown in the drawings—that is to say, slits 31 to receive the ends of the band are cut in the peripheries of the wheel and roller respectively, and eccentrics 32 to clamp said ends are mounted in proximity to said slits, so that if the eccentrics be properly turned they will clamp or release the ends adjacent thereto as desired. Each of the eccentrics is provided with a suitable handle by which it may be manipulated.

The ends of the film are preferably applied to longitudinal slits 33 in the peripheries of the rollers 18, 21, respectively, and held firmly therein by means of pins 34 inserted in longitudinal channels in the sides of said slits, as seen in Figs. 2 and 6. Thus by withdrawing the pins the ends of the film may be released.

As a simple and efficient means to hold the camera temporarily in place when the spring 10 is wound up, I provide a suitable catch that may be moved into or out of play at will. In the present instance this catch comprises a U-shaped head 35 supported upon a lever 36 which is fulcrumed between lugs on the base-plate. This lever with the head is held normally elevated by the action of a suitably disposed spiral spring 37 yet it may be readily depressed and locked down against the action of the spring by means of a swivel finger 38 adjacent thereto. Said lever and head are so located that when the camera has been turned sufficiently far to wind the spring (the head being depressed) the arm is immediately above the head which latter, upon being released, embraces said arm and thus locks the camera. When the head is subsequently depressed to liberate the arm, the camera is free to rotate as above described.

Thus far, the parts have been described as applied to a camera equipped with a lens having a fixed point of focus. In order, however, that the focal distance of the film in respect to the particular lens in use may be varied to meet special requirements, and the diameter of the wheel correspondingly changed, I have devised the following construction, reference being had more especially to Figs. 1 and 7 to 13 both inclusive of the drawings—that is to say, the forward portion of the camera is provided with an ordinary bellows 39 whereby the rearward or film containing portion may be adjusted from or toward the lens to vary the focal distance of the film. The arm 9 is fitted to a groove in the bottom of said rear portion to permit of the longitudinal adjustment of the latter. The wheel 15 is composed of a grooved ring 40 divided into a series of radially-movable segments 41 which are supported on the rim of a spider 42 the latter being firmly secured to the vertical post 6. The segments are provided with centrally extending arms 43 which are fitted to guide holes in concentric flanges 44 on the spider, whereby radial movement of the segments may be effected. These arms are provided with upwardly projecting studs 45 which enter a series of corresponding cam ways 46 in a revoluble plate 47 supported on the post 6. The cam-ways curve gradually outward, as shown, so that if the plate be partially turned in the direction illustrated by the arrow in Fig. 7ª, the studs, together with the connected arms and segments will be moved outward simultaneously to increase the diameter of the wheel. If said wheel be subsequently turned in a reverse direction the parts will be drawn inward to decrease the diameter of the wheel. The cam plate is preferably constructed of a series of appropriately curved strips 47 arranged in juxtaposition and secured at their ends respectively to an inner skeleton wheel 48 and an outer concentric ring 49 the spaces between the successive strips constituting the cam-ways for the studs. A means which I employ for turning this ring, as required, comprises a rack, 50 (Figs. 12 and 13) secured to the under side of the outer ring, and engaged by a pinion 51 on the upper end of a depending shaft 52 which extends through and is supported in one of the arms of the spider. This stud is provided with a head 53 whereby it may be turned to operate the pinion, and thus through the medium of the rack adjust the cam-plate and its connections. To lock the parts in their positions of adjustment I preferably extend one of the studs 45 some distance above the top of the cam plate, screwthread this projecting end and provide it with a set-nut 54. I also enlarge the lower portion of this stud so as to form a shoulder 55 which takes against the under side of the cam-plate. (See Fig. 9.) Thus if the nut be screwed down upon the said plate the parts will be clamped in place. In order that the continuity of the periphery of the segmental wheel may be preserved when the segments are adjusted as above described, I secure one end of a metallic band 56 to one of the segments (as at x Fig. 14) and run said band around the series. The other end of the band is secured to the rim of a pulley 57 which is supported in a frame 58 on one of the spider arms, the stud of this pulley being provided with a thumb piece 59 whereby the pulley may be turned to take up or release the band as required by the adjustment of the segments. The stud is provided with a ratchet wheel 60 with which engages an adjacent pawl 61 which serves to hold the pulley in place when the latter is wound up sufficiently to tighten the band. When the pawl is released the pulley is free to turn to release a portion of the band 56 that is wound thereon.

One of the segments of the wheel 15 is detachably connected with the rear or film-containing portion of the camera case, so that said portion, with its film, is adjusted coincidently with the wheel—the varied focal distance of the film and the radius of the wheel thus being in harmony. The connection is detachable so that when the proper adjustment of the parts has been made, the camera case may be disconnected from the segment, to permit of the rotation of said case. In the present instance, the connecting means comprises a stud 62 rising from the segment, and a hook 63 pivoted to the bottom of the camera case and adapted to be engaged with or disengaged from said stud. See Figs. 10 and 11.

Having thus described my invention, I claim—

1. The combination with a rotatable camera case, and its film delivery and film take-up rollers, of a fixed wheel around which the said case is adapted to rotate, and a flexible band of substantially the same thickness as the film, the extremities of said band being secured to one of said rollers and to the said wheel, respectively, whereby the said band, when coiled upon the roller similarly to the film, will be unwound therefrom upon the periphery of said wheel during the revolution of the camera case, substantially as described.

2. The combination with a rotatable camera case, and its film delivery and film take-up rollers, of a fixed wheel around which the said case is adapted to revolve, a flexible band of substantially the same thickness as the film, and means for detachably connecting its ends to the said wheel and film delivery roller, respectively, whereby the said band when coiled upon the latter similarly to the film, will be unwound therefrom upon the periphery of said wheel during the revolution of the camera case, substantially as described.

3. The combination with a rotatable camera case, and its film delivery and film take-up rollers, of a fixed wheel around which the said case is adapted to revolve, a flexible band of substantially the same thickness as the film, and means for connecting its ends to the said wheel and film delivery roller, respectively, together with spring and gear train devices for revolving the said camera case, substantially as described.

4. The combination with a rotatable camera case, and its film delivery and film take-up rollers, of a fixed wheel around which the said case is adapted to revolve, and a flexible band of substantially the same thickness as the film, the extremities of said band being secured to the film delivery roller and to the said wheel, respectively, spring devices for operating the take-up roller and counter spring devices for governing the movement of the delivery roller, together with the oppositely disposed ratchet and pawl mechanism co-acting with the said spring devices, substantially as described.

5. The combination with a rotatable camera case, and its film delivery and film take-up rollers, of a wheel provided with an adjustable periphery around which said case is adapted to rotate, means for detachably securing said wheel to the camera case, and a flexible connection between said wheel and one of said rollers, substantially as described.

6. The combination with a rotatable camera case and its film delivery and film take-up devices, of a segmental wheel around which said case is adapted to rotate, means for adjusting the segments thereof, means for detachably securing said wheel to the camera case, and a band connecting said wheel with one of said rollers, substantially as described.

7. The combination with a rotatable camera case and its film delivery and film take-up devices, of a segmental wheel around which said camera case is adapted to rotate, means for adjusting the segments thereof, an adjustable band extending around said wheel, a locking and releasing device for said band, means for detachably securing said wheel to the camera case, and a band connecting said segmental wheel with the film delivery device, substantially as described.

8. The combination with a rotatable camera case and its film-delivery and film take-up devices of a wheel around which said case is adapted to revolve, and with which it is connected, said wheel comprising a series of segments, arms extending therefrom, a supporting and guide device for said arms, pins on the latter, a cam plate engaging said pins, means for adjusting said cam plate and means for securing it in its positions of adjustment, substantially as described.

9. The combination with a rotatable camera case, and its film-delivery and film take-up rollers, of a fixed wheel around which said case is adapted to rotate, eccentric clamps in said film-delivery roller and wheel, and a band clamped at its extremities to the said latter roller and wheel, respectively, substantially as described.

In testimony whereof I have hereunto affixed my signature in the presence of two subscribing witnesses.

PERCY SHELLEY MARCELLUS.

Witnesses:
JOHN R. NOLAN,
JESSE B. HELLER.